United States Patent [19]

Gros

[11] Patent Number: 4,759,874
[45] Date of Patent: Jul. 26, 1988

[54] BENZOCYCLOBUTENE-BASED DIE ATTACH ADHESIVE COMPOSITIONS

[75] Inventor: William A. Gros, Baton Rouge, La.

[73] Assignee: The Dow Chemical Company, Midland, Mich.

[21] Appl. No.: 81,056

[22] Filed: Aug. 3, 1987

[51] Int. Cl.$^4$ .............................................. H01B 1/04
[52] U.S. Cl. .................................. 252/512; 252/513; 252/514; 156/307.3; 156/331.1; 156/334; 524/439; 524/440
[58] Field of Search ...................... 252/512, 513, 514; 156/307.3, 331.1, 334; 524/439, 440

[56] References Cited

U.S. PATENT DOCUMENTS

| | | | |
|---|---|---|---|
| 2,970,077 | 1/1961 | Groves | 156/307.3 |
| 3,265,640 | 8/1966 | Overhults | 528/396 |
| 3,347,978 | 10/1967 | Simon et al. | 156/276 |
| 3,981,762 | 9/1976 | Davis et al. | 156/307.3 |
| 4,466,850 | 8/1984 | Eichelberger et al. | 156/276 |
| 4,540,763 | 9/1985 | Kirchhoff | 526/281 |
| 4,661,193 | 4/1987 | Kirchhoff et al. | 156/307.3 |

OTHER PUBLICATIONS

Shukla et al., Solid State Technology, 7-85, pp. 67-74.
Bolger, Int. J. Hybrid Microelectronics, 11-82, pp. 496-499.
Estes et al., Proceedings of the 1985 International Symposium on Microelectronics, 11/11-14/85, pp. 391-401.
Bolger, Proceedings of the First Technical Conference on Polyimides, Soc. of Plastics Engineers, (1985), pp. 871-887.
Shappe et al., J. of Adhesion, (1983), pp. 1-38.
Estes, Solid State Technology, 8-84, pp. 191-197.

Primary Examiner—Josephine Barr
Attorney, Agent, or Firm—Matthew S. Goodwin

[57] ABSTRACT

The invention is a die attach adhesive composition comprising a homogeneous blend of an organopolysiloxane-bridged bisbenzocyclobutene monomer, an organosilane adhesion aid, and a finely divided electrically conductive metal. The composition is easy to apply, exhibits good adhesive strength and thermal stability at high temperatures, and does not require solvents, initiators, or curing agents. Weight loss on cure is minimal.

18 Claims, No Drawings

BENZOCYCLOBUTENE-BASED DIE ATTACH ADHESIVE COMPOSITIONS

BACKGROUND OF THE INVENTION

This invention relates to die attach adhesive compositions. More specifically, it relates to die attach adhesive compositions containing at least one bisbenzocyclobutene monomer.

A die attach adhesive bonds the inactive side of a semiconductor chip to a semiconductor package. During assembly of the semiconductor package, the die attach adhesive holds the chip firmly in place during wire bonding and encapsulation. After assembly, the adhesive provides a conductive path to remote heat from the chip and to provide an electrical ground. Examples of commonly used die attach adhesives are eutectic solders, conductive epoxies, and conductive polyimides.

Eutectic solders are metal alloys typically made with gold. A "preform", which is a metal foil cut to the shape and size of the semiconductor chip, is deposited on the desired substrate of the package and is heated to a temperature near the melting point of the preform. The chip can then be placed onto the preform with a scrubbing motion. Although eutectic solders are very reliable and exhibit outstanding thermal stability, they are expensive and difficult to process.

Conductive epoxies are typically low viscosity pastes containing at least 70 percent of an electrically conductive metal, typically silver. The epoxy is applied to the substrate of the package by conventional means and the chip is then placed in contact with the coated substrate. The epoxy can then be cured in one step. Epoxies are less expensive than eutectic solders, are easy to process, and exhibit excellent adhesive strength. However, they possess poor thermal stability at high temperatures and an unacceptable coefficient of thermal expansion at high temperatures, properties which are necessary for advanced applications in electronics.

Conductive polyimides are similar to conductive epoxies. They possess acceptable adhesive strength, excellent thermal stability at high temperatures, and an acceptable coefficient of thermal expansion. Unfortunately, polyimides must be dissolved in a high boiling solvent, such as N-methylpyrrolidone, for use as a die attach adhesive. The solvent must be evaporated during a two-step cure. This results in a substantial weight loss during cure and can lead to void formation under the semiconductor chip. Voids can reduce adhesive strength and thermal conductivity, problems which become more serious as the chip size increases.

Copending U.S. application Ser. No. 005,189 (filed Jan. 20, 1987) discloses die attach adhesive compositions comprising an arylcyclobutene monomer (more commonly referred to as a "cyclobutarene" monomer) and an electrically conductive metal. The compositions are easy to process, exhibit outstanding thermal stability at high temperatures, and exhibit an acceptable coefficient of thermal expansion at high temperatures. Furthermore, unlike conductive polyimides, solvents are unnecessary and weight loss on cure is minimal. However, the adhesive strength of these conductive arylcylobutanes is less than the adhesive strength of the polyimides.

In view of the deficiencies of the prior art a die attach adhesive composition, that is easy to process, exhibits excellent adhesive strength, has thermal stability at high temperatures, and an acceptable coefficient of thermal expansion, is needed. Furthermore, a composition, that does not require any solvent, initiator, or curing agent for use as a die attach, does not require a two-step cure, and does not exhibit a substantial weight loss on cure, is needed.

SUMMARY OF THE INVENTION

The present invention is a die attach adhesive composition comprising a homogeneous blend of:

(a) a bisbenzocyclobutene monomer of the formula:

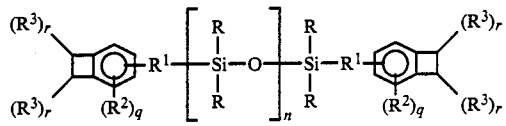

wherein:
each R is independently alkyl of 1 to 6 carbon atoms, cycloalkyl, aralkyl, or phenyl;
each $R^1$ is independently vinyl, allyl, methallyl, or styryl;
each $R^2$ is independently substituted or unsubstituted alkyl of 1 to 6 carbon atoms, methoxy, methyl, carboxy, trifluoromethyl carboxy, nitro, chloro, bromo, or iodo;
each $R^3$ is independently chloro, bromo, iodo, nitro, substituted or unsubstituted alkyl of 1 to 6 carbon atoms, and cyano;
n is an integer of 1 or more; and
each q and r are independently integers of zero or 1;
(b) an organosilane adhesion aid; and
(c) a finely divided electrically conductive metal.

The die attach adhesive composition of this invention is a low viscosity paste that can be applied and processed by conventional methods. It does not require solvents, initiators, or curing agents and can be cured in one step. Unlike conductive polyimides, the weight loss on cure is minimal. The composition exhibits outstanding thermal stability at high temperatures and an acceptable coefficient of thermal expansion at high temperatures.

Surprisingly, the combination of the organopolysiloxane-bridged bisbenzocyclobutene monomer and the organosilane adhesion aid dramatically increases the adhesive strength of the die attach adhesive composition relative to the adhesive strength achieved by conductive arylcyclobutene compositions.

DETAILED DESCRIPTION OF THE INVENTION

The bisbenzocyclobutene monomer of the die attach adhesive composition is bridged by an organopolysiloxane group. The monomer has the following formula:

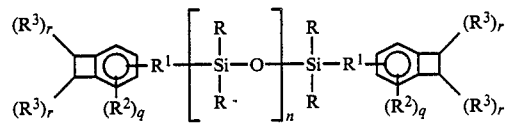

wherein:
each R is independently alkyl of 1 to 6 carbon atoms, cycloalkyl, aralkyl, or phenyl;

each R[1] is independently vinyl, allyl, methallyl, or styryl;

each R[2] is independently substituted or unsubstituted alkyl of 1 to 6 carbon atoms, methoxy, methyl carboxy, trifluoromethyl carboxy, nitro, chloro, bromo, or iodo;

each R[3] is independently chloro, bromo, iodo, nitro, substituted or unsubstituted alkyl of 1 to 6 carbon atoms, and cyano;

n is an integer of 1 or more; and each q and r are independently integers of zero or 1.

Preferably, n is 1 so that the organopolysiloxane bridging member is an organodisiloxane. The most preferred organodisiloxane bridging member is commonly referred to as 1,1,3,3-tetramethyl-1,3-divinyldisiloxane. The most preferred bisbenzocyclobutene monomer has the following formula:

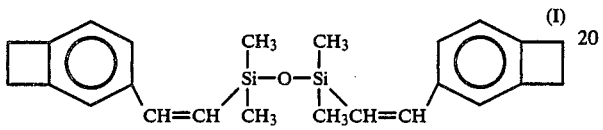

The bisbenzocyclobutene monomers of this invention can be prepared by reacting a bromobenzocyclobutene with the desired organopolysiloxane bridging member. The reaction is possible because the organopolysiloxane bridging member is a bisvinyl or bisallyl bridging member. The substitution reaction of an olefinic compound possessing at least one hydrogen on a vinylic position with an organic halide is known and disclosed in U.S. Pat. No. 3,922,299 (Heck), which is incorporated by reference herein.

Heck discloses the substitution reaction of aryl halides with olefinic compounds in the presence of a Group VIII metal, a trivalent arsenic or phosphorous compound, and a soluble trialkylamine. The reaction displaces a hydrogen on a vinylic or allylic position with the organic compound. For example, the most preferred bisbenzocyclobutene monomer can be prepared by reacting about 2 moles of bromobenzocyclobutene with about one mole of 1,1,3,3-tetramethyl-1,3-divinyldisiloxane in the presence of a catalytic amount of palladium acetate and tri(ortho-tolyl)phosphine, in addition to triethylamine, which acts as an acid scavenger.

Organopolysiloxanes and processes for preparing them are known and disclosed in U.S. Pat. Nos. 3,584,027; 3,701,195; 3,770,768; and 3,803,196. A process for preparing bromobenzocyclobutene is disclosed by Lloyd et al., *Tetrahedron*, Vol. 21, pp. 245–254 (1965) at page 253.

In one embodiment of the invention, the organosilane adhesion aid of the die attach adhesive composition has the following formula:

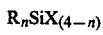

$R_nSiX_{(4-n)}$ wherein:

R is a nonhydrolyzable organic radical that prossesses a benzocyclobutene-reactive functionality;

X is alkoxy, acyloxy, or amino; and n is an integer of 1, 2, or 3.

A benzocyclobutene-reactive functionality is a dienophilic functionality capable of reacting with the bisbenzocyclobutene monomer component of the invention. When the adhesive composition is cured, the cyclobutane rings of the benzocyclobutene groups open. The opened rings form conjugated dienes (orthoquinodimethanes) that react with dienophilic ("diene loving") functionalities. Typically, opened rings react with other opened rings. However, opened rings can also react with olefinic or acetylenic functionalities via Diels-Alder reactions as disclosed in Feiser and Feiser, *Organic Chemistry*, 3rd ed., (1980).

Organosilane adhesion aids of this invention are known and sold commercially by Petrarch Systems Inc. (see, for example, Petrarch's catalog of silicon compounds, published in 1984, at pages 71–76).

The preferred organosilane adhesion aid is that depicted when the subscript n of the formula disclosed hereinbefore is 1 and R contains a benzocyclobutene group. A preferred adhesion aid is 2-vinyl(4-benzocyclobutenyl)triethoxy silane and has the following formula:

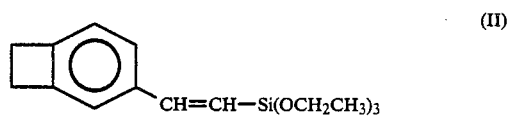

This adhesion aid can be prepared by reacting equimolar amounts of 4-bromobenzocyclobutene with vinyltriethoxysilane (sold commercially by Petrarch Systems, Inc.) using the process conditions disclosed in Heck. Preferably, the reaction is carried out in the presence of a suitable nonreacting diluent, such as acetonitrile, to control the reaction temperature during the exothermic reaction.

Another preferred adhesion promoter is 3-amido(4-benzocyclobutenyl)propyl triethoxy silane and has the formula:

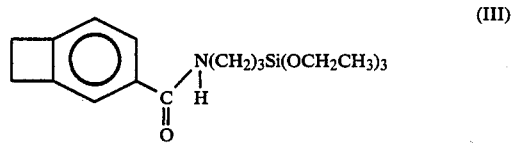

Yet still another preferred adhesion aid is amido(4-benzocyclobutenyl)phenyl trimethoxy silane and has the formula:

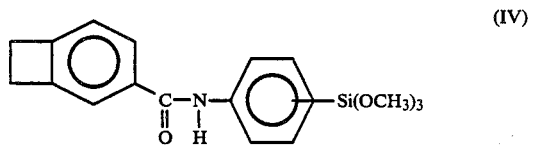

These monomers can be prepared by reacting equimolar amounts of benzocyclobutene 4-acid chloride with either 3-aminopropyltriethoxysilane or aminophenyltrimethoxysilane (both of which are sold commercially by Petrarch Systems Inc.). The reaction is carried out in the presence of a suitable nonreacting diluent, such as toluene or methylene chloride, and a tertiary amine which acts as an acid scavenger. Preferably, the reaction temperature is maintained below 20° C. The process for preparing the acid chloride is disclosed in U.S. Pat. No. 4,540,763.

Although the mechanism by which the organosilane adhesion aid enhances the adhesive strength of the die attach composition is not fully understood, it is believed that the adhesion aid promotes bonding between the substrate of the semi-conductor package and the bisbenzocyclobutene monomer. If desired, a mixture of two or more organosilane adhesion aids can be employed in the die attach composition to enhance the adhesive strength.

The electrically conductive metal of the die attach adhesive composition is any metal which provides the desired electrical conductivity for the composition. The metal must be in a finely divided form suitable for intimate blending with the monomer and adhesion promoter, such as, for example, metal flake or powder. Examples of the electrically conductive metals of this invention include oxidation resistant metals such as silver, gold, copper, nickel and mixtures of these metals. The preferred electrically conductive metal is silver flake containing low ionic impurities. This metal as well as other electrically conductive metals are available commercially.

The amount of the bisbenzocyclobutene monomer in the die attach adhesive composition can range from about 5 to about 30, more preferably from about 10 to about 25, percent of the weight of the composition. The amount of organosilane adhesion aid can range from about 1 to about 10, more preferably from about 2 to about 6, percent of the weight of the composition. The electrically conductive metal must be present in an amount sufficient to reach the percolation threshold value for the composition, which is the value at which electrical conductivity can be measured. A further discussion of percolation thresholds can be found in Kirkpatrick, *Reviews of Modern Physics*, Vol. 45, No. 4, pp. 574–88, October 1973.

In a preferred embodiment of this invention, a second bisbenzocyclobutene monomer is added to the die attach adhesive composition. This monomer is added to control the viscosity of the final blend and to maintain adhesion after the blend is cured. Examples of suitable bisbenzocyclobutene monomers and processes for preparing them are disclosed in U.S. Pat. No. 4,540,763 and U.S. copending application Ser. No. 005,189 (filed Jan. 20, 1987), both of which are incorporated by reference herein.

Examples of the monomers disclosed include those having any of the formulae:

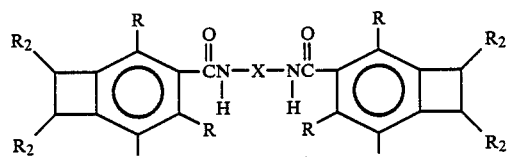

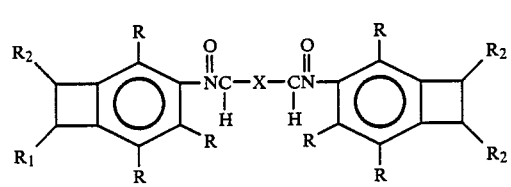

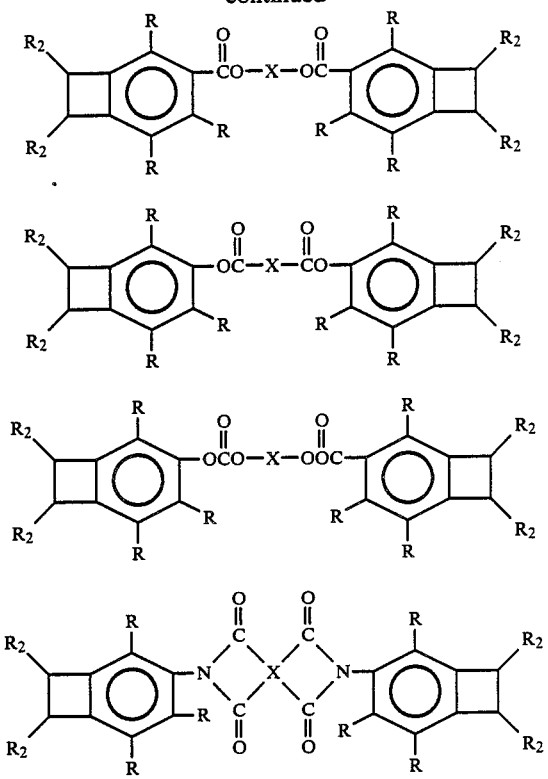

wherein
R is separately in each occurrence hydrogen, an electron-withdrawing substituent, or an electron-donating substituent;
X is $-(CH_2)_p-$, phenylene,

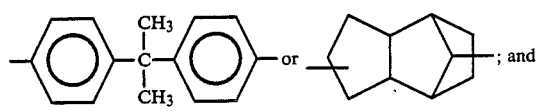

p is an integer of between 2 and 10.

The preferred monomers are diamide and diester-bridged bisbenzocyclobutenes having the following formulae:

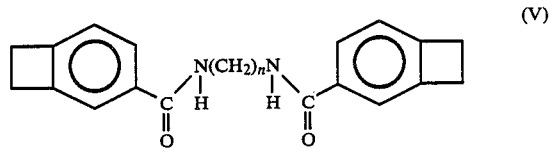

wherein n is an integer from 2 to 12, inclusive; and

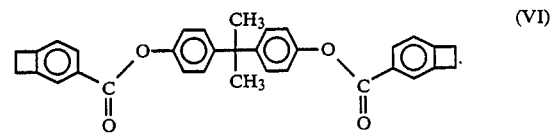

Another preferred monomer is a divinyl-bridged bisbenzocyclobutene monomer having the following formula:

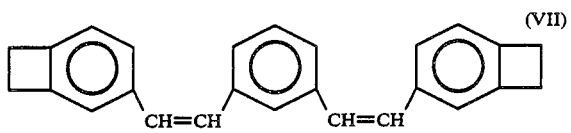

(VII)

The most preferred monomer is the monomer of Formula V wherein the subscript n is 6 or 7.

The amount of the second bisbenzocyclobutene monomer in the die attach adhesive composition, if employed, can range from about 1 to about 20, more preferably from about 5 to about 15, percent of the weight of the composition.

A homogeneous blend of the die attach adhesive composition is formed by initially mixing the polyorganosilane-bridged bisbenzocyclobutene monomer, the organosilane adhesion aid, and the second bisbenzocyclobutene monomer, if employed. The finely divided electrically conductive metal is then blended with the mixture to a degree sufficient to wet the surface area of the metal particles. Intimate mixing can then be achieved by further blending of the components on a high shear mixing device, such as a three-roll mill.

After the homogeneous blend is formed, the composition is applied to the substrate of the semiconductor package. The composition can be applied by screen printing, syringe dispensing, or dot transferring using automated or manual die bonding equipment. The inactive side of the semiconductor chip is placed on the applied area and the composition is then cured. The composition can be cured thermally, without the use of catalysts, initiators, or solvents. Generally, as the cure temperature increases, the cure time decreases. For example, the composition can be sufficiently cured in about 1 hour at 220° C. and in less than 5 minutes at 270° C.

The following examples illustrate but do not limit the scope of this invention.

EXAMPLE 1

0.7 Grams (g) of the monomer disclosed as Formula I, 0.375 g of the monomer disclosed as Formula V wherein the subscript n is 6, and 0.175 g of the organosilane adhesion aid disclosed as Formula III are mixed by hand with a flat edge spatula. 3.75 Grams of silver flake sold commercially by Metz Metallurgical Corporation as Fine Silver Flake #15 is added to the blend and mixed with the blend by hand until all of the silver flake is wetted. The blend is intimately mixed on a 3-roll mill under high shear to give a smooth paste that can be molded or applied for chip attachment by the usual accepted methods. The blended formulation can be cured in a convection oven at 240° C. for 20 minutes.

Tests for thermal properties, bond strength, coefficient of linear thermal expansion, and volume resistivity are performed according to the procedures described in Military Specification A-87172 and Military Standard 883C. Similar tests are performed for two commercially available epoxy-based formulations and two commercially available polyimide-based formulations. The results appear in Table I.

TABLE I

| Property Measured | Benzocyclobutene-Based Formulation | EPOXY A[5] | EPOXY B[6] | POLYIMIDE A[7] | POLYIMIDE B[8] |
| --- | --- | --- | --- | --- | --- |
| Percent Weight Loss on Cure[1] | 1.08 | 2.9 | 2.7 | 17.5 | 20.0 |
| Percent Weight Loss at 300° C.[1] | 0.03 | 0.33 | 0.13 | 1.13 | 6.01 |
| Volume Resistivity, ohm · cm (25° C.) | $9.0 \times 10^{-5}$ | $1.7 \times 10^{-4}$ | $5.3 \times 10^{-4}$ | $4.5 \times 10^{-5}$ | $9.3 \times 10^{-5}$ |
| Die Shear[2], psi (40 × 40 mil die, 25° C.) | 3437 | 4260 | 6875 | 3341 | 3121 |
| Glass Transition Temperature $(T_g)$[3], °C. | 370 | 75 | 110 | Not Measured | Not Measured |
| Coefficient of Linear Thermal Expansion[4], inch/inch/°C.: | | | | | |
| −70° C. to $T_g$ | $45 \times 10^{-6}$ | $57 \times 10^{-6}$ | $72 \times 10^{-6}$ | Not Measured | Not Measured |
| $T_g$ to 150° C. | — | $189 \times 10^{-6}$ | $160 \times 10^{-6}$ | | |

[1]Measured by thermogravometric analysis (TGA) in air.
[2]Measured on a Model 520D Die Adhesion Tester from Anza Technology, Inc.
[3]Measured by thermomechanical analysis (TMA).
[4]Measured on a Mettler TMA-40 connected to a Mettler TC-10A Thermal Analysis Processor.
[5]Sold commercially by Ablestik Labs as 84-1LMI; recommended cure schedule = 150° C./60 min.
[6]Sold commercially by Epoxy Tech, Inc. as H35-175M; recommended cure schedule: 150° C./90 min.
[7]Sold commercially by Epoxy Tech, Inc. as P-10; recommended cure schedule: 150° C./60 min.
[8]Sold commercially by Epoxy Tech, Inc. as P-1011; recommended cure schedule: 70° C./30 min, 150° C./60 min.

The data in Table I indicates that the die attach adhesive composition of this invention exhibits comparable adhesive strength relative to the adhesive strength exhibited by the polyimide compositions, without the attendant weight loss on cure caused by evaporation of solvents or other volatiles. Table I also indicates that, unlike the epoxy compositions, the compositions of this invention exhibit excellent thermal stability at high temperatures as well as a relatively low coefficient of thermal expansion. All of the compositions exhibit acceptable electrical conductivity as measured by the volume resistivity.

EXAMPLE 2

The procedure of Example 1 is followed to prepare 8 additional blends, except that the organosilane adhesion aid is not added to 3 of the blends and the amount of each component added to each of the 8 blends varied. The die shear for each blend is measured. The results appear in Table II.

TABLE II

| Blend Number | Weight Percent of Component 1[1] | Weight Percent of Component 2[2] | Weight Percent of Component 3[3] | Weight Percent of Silver Flake | Die Shear[5], psi (40 × 40 mil die, 25° C.) |
|---|---|---|---|---|---|
| 1* | 18.75 | 6.25[4] | None | 75 | 2283 |
| 2* | 17 | 13 | None | 70 | 1664 |
| 3* | 20 | 10 | None | 70 | 1911 |
| 4 | 15.6 | 7.8 | 3.9 | 72.7 | 3493 |
| 5 | 12 | 13.3 | 4.6 | 70 | 3740 |
| 6 | 13 | 13 | 4 | 70 | 3534 |
| 7 | 17 | 9 | 4 | 70 | 3355 |
| 8 | 22 | 4 | 4 | 70 | 3231 |

*Not an example of this invention.
[1]Component 1 is the monomer disclosed as Formula I.
[2]Component 2 is the monomer disclosed as Formula V wherein the subscript n is 6.
[3]Component 3 is the organosilane adhesion promoter disclosed as Formula III.
[4]Component 2 of blend 1 is the monomer disclosed as Formula V wherein the subscript n is 7.
[5]Measured on a Model 520D Die Adhesion Tester from Anza Technology, Inc.

Table II indicates a dramatic improvement in adhesive strength for the die attach adhesive compositions of this invention relative to the adhesive strength exhibited by benzocyclobutene-based compositions without the organosilane adhesion promoter.

EXAMPLE 3

The procedure of Example 1 is followed to prepare 7 additional blends, except that different resin components are blended for each of the 7 blends and the amount of some of the components added to each blend is varied. The volume resistivity and die shear for each blend is measured. The results appear in Table III.

TABLE III

| Blend Number | 1[1] | 2[2] | 3[3] | 4[4] | 5[5] | 6[6] | 7[7] | 8[8] | 9[9] | Silver Flake | Volume Resistivity,[10] ohm · cm (25° C.) | Die Shear[11] PSI (40 × 40 mil die, 25°) |
|---|---|---|---|---|---|---|---|---|---|---|---|---|
| 1 | 17 | 4 | 9 | | | | | | | 70 | $1.6 \times 10^{-2}$ | 3438 |
| 2 | 17 | 4 | | 9 | | | | | | 70 | $1.1 \times 10^{-4}$ | 3726 |
| 3 | 17 | | | 4 | 9 | | | | | 70 | $1.3 \times 10^{-3}$ | 4153 |
| 4 | 17 | | | | | | 9 | 4 | | 70 | $1.1 \times 10^{-4}$ | 3011 |
| 5 | 17 | | | | | 9 | | 4 | | 70 | $2.2 \times 10^{-4}$ | 3369 |
| 6 | 14 | 3.5 | | | 7.5 | | | 9 | | 75 | $9.1 \times 10^{-5}$ | 3520 |
| 7 | 17 | 4 | | | | | | | | 70 | $1.1 \times 10^{-2}$ | 3548 |

[1]Component 1 is the monomer disclosed as Formula I.
[2]Component 2 is the organosilane adhesion promoter disclosed as Formula III.
[3]Component 3 is the monomer disclosed as Formula VI.
[4]Component 4 is the monomer disclosed as Formula V wherein the subscript n is 12.
[5]Component 5 is the organosilane adhesion promoter disclosed as Formula II.
[6]Component 6 is the monomer disclosed as Formula V wherein the subscript n is 6.
[7]Component 7 is the monomer disclosed as Formula V wherein the subscript n is 7.
[8]Component 8 is vinyltriethoxysilane (sold commercially by Petrarch Systems, Inc.).
[9]Component 9 is the monomer disclosed as Formula VII.
[10]Sold commercially by Metz Metallurgical Corporation as Fine Silver Flake #15.
[11]Measured on a Model 520D Die Adhesion Tester from Anza Technology, Inc.

Table III indicates that acceptable electrical and adhesive properties are still obtained when different resin components at varying concentrations are blended to prepare the die attach adhesive compositions of this invention.

EXAMPLE 4

The procedure of Example 1 is followed to prepare an additional blend, except that the silver flake is replaced with nickel flake sold commercially by Metz Metallurgical Corporation as Nickel Flake Batch #109. The volume resistivity of the cured blend is $2.3 \times 10^{-3}$ ohm·cm and its die shear (40×40 mil die, 25° C.) as measured on a Model 520D Die Adhesion Tester from Anza Technology, Inc. is 3300 psi. This data indicate that excellent results can be obtained with conductive metals other than silver.

What is claimed is:

1. A die attach adhesive composition comprising a homogeneous blend of:
   (a) about 5 to about 30 weight percent of a bisbenzocyclobutene monomer of the formula:

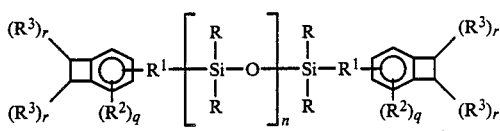

wherein:
each R is independently alkyl of 1 to 6 carbon atoms, cycloalkyl, aralkyl, or phenyl;
each $R^1$ is independently vinyl, allyl, methallyl, or styryl;
each $R^2$ is independently substituted or unsubstituted alkyl of 1 to 6 carbon atoms, methoxy, acetate, trifluoroacetate, nitro, chloro, bromo, or iodo;
each $R^3$ is independently chloro, bromo, iodo, nitro, substituted or unsubstituted alkyl of 1 to 6 carbon atoms, and cyano;
n is an integer of 1 or more; and each q and r are independently integers of zero or 1;
(b) about 1 to about 10 weight percent of an organosilane adhesion promoter of the formula:

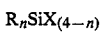

wherein
R is a nonhydrolyzable organic radical that possesses a benzocyclobutene-reactive functionality;
X is alkoxy, acyloxy, or amino; and
n is an integer of 1, 2, and 3; and
(c) an amount of an electrically conductive metal effective for the composition to reach the percolation threshold.

2. The composition of claim 1 wherein n is 1.
3. The composition of claim 2 wherein the bisbenzocyclobutene monomer has the formula:

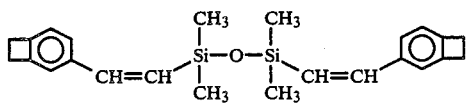

4. The composition of claim 1 wherein n is 1.
5. The composition of claim 4 wherein R contains a benzocyclobutene group.
6. The composition of claim 5 wherein the organosilane adhesion promoter has the formula:

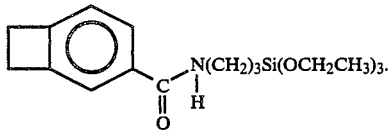

7. The composition of claim 5 wherein the organosilane adhesion promoter has the formula:

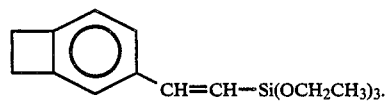

8. The composition of claim 5 wherein the organosilane adhesion promoter has the formula:

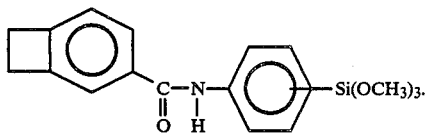

9. The composition of claim 1 wherein the electrically conductive metal is silver, gold, copper, or nickel.
10. The composition of claim 9 wherein the electrically conductive metal is silver flake.
11. The composition of claim 1 further comprising about 1 to about 20 weight percent of a second bisbenzocyclobutene monomer of any one of the formulae:

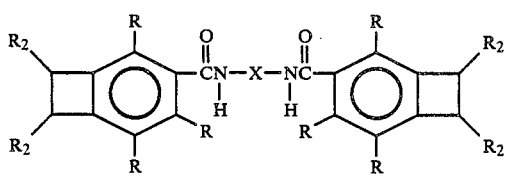

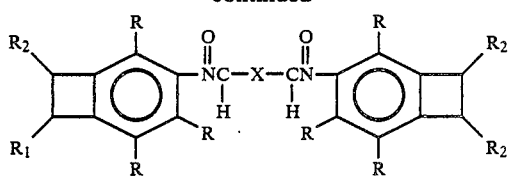

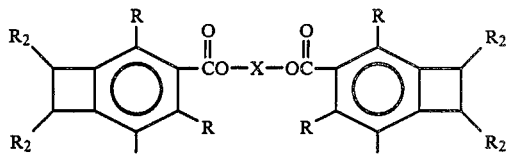

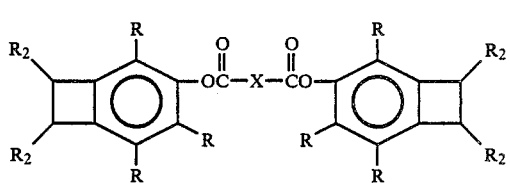

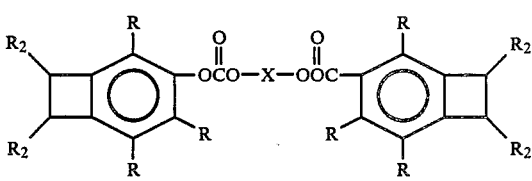

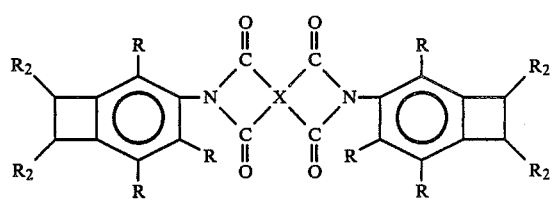

wherein
R is separately in each occurrence hydrogen, an electron-withdrawing substituent, or an electron-donating substituent;

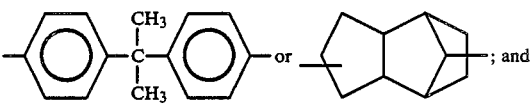

p is an integer of between 2 and 10.

12. The composition of claim 11 wherein the second bisbenzocyclobutene monomer has the formula:

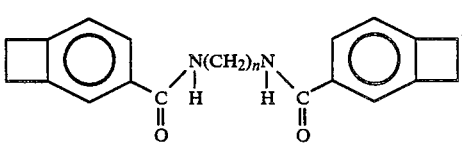

wherein n is 6 or 7.

13. The composition of claim 11 wherein the second bisbenzocyclobutene monomer has the formula:

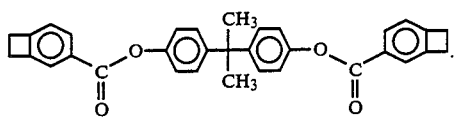

14. The composition of claim 11 wherein the second bisbenzocyclobutene monomer has the formula:

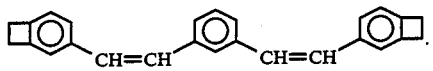

15. The composition of claim 1 wherein the amount of the bisbenzocyclobutene monomer can range from about 10 percent to about 25 percent of the weight of the composition.

16. The composition of claim 1 wherein the amount of the organosilane adhesion promoter can range from about 2 percent to about 6 percent of the weight of the composition.

17. The composition of claim 11 wherein the amount of the second bisbenzocyclobutene monomer can range from 5 percent to about 15 percent of the composition.

18. The composition of claim 1 further comprising of about 1 to about 20 weight percent of a second bisbenzocyclobutene monomer of the formula:

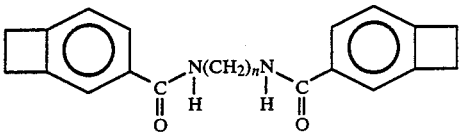

wherein n is 12.

* * * * *

UNITED STATES PATENT AND TRADEMARK OFFICE
CERTIFICATE OF CORRECTION

PATENT NO. : 4,759,874

DATED : July 26, 1988

INVENTOR(S) : William A. Gros

It is certified that error appears in the above-identified patent and that said Letters Patent is hereby corrected as shown below:

Column 1, line 15, "remote" should read --remove--;
Column 2, line 26 and 27, "methyl, carboxy" should read --methyl carboxy--

Claim 11, column 12, after line 45 insert --X is $(CH_2)_p$, phenylene--

Signed and Sealed this

Twenty-eighth Day of May, 1991

*Attest:*

HARRY F. MANBECK, JR.

*Attesting Officer*  Commissioner of Patents and Trademarks